United States Patent [19]

Yoshimura et al.

[11] Patent Number: 5,104,907
[45] Date of Patent: Apr. 14, 1992

[54] PROCESS FOR PRODUCING HIGH RESILIENCE POLYURETHANE FOAM

[75] Inventors: Hiroyuki Yoshimura; Shuichi Okuzono; Shoji Arai, all of Shinnanyo, Japan

[73] Assignee: Tosoh Corporation, Shinnanyo, Japan

[21] Appl. No.: 559,348

[22] Filed: Jul. 30, 1990

[30] Foreign Application Priority Data

Jul. 28, 1989 [JP] Japan .................. 1-193976
Sep. 11, 1989 [JP] Japan .................. 1-232860
Jul. 4, 1990 [JP] Japan .................. 2-175284
Jul. 5, 1990 [JP] Japan .................. 2-176453

[51] Int. Cl.$^5$ ............................................. C08G 18/14
[52] U.S. Cl. .................................. 521/128; 521/110; 521/112; 521/123; 521/137; 521/159
[58] Field of Search ............... 521/108, 110, 112, 123, 521/137, 128, 159

[56] References Cited

U.S. PATENT DOCUMENTS 4,264,744 8/1981 Milovanovic et al. ............. 521/110
4,910,231 3/1990 Pham et al. ........................ 521/159

OTHER PUBLICATIONS

High Polymers, vol. XVI, "Polyurethanes, Chemistry and Technology": by Saunders-Frisch, Interscience Publishers, New York, London, vol. I, 1962, pp. 32-42, 44-54 and vol. II, 1964, pp. 5-6 and 198-199.

Primary Examiner—John Kight, III
Assistant Examiner—Duc Truong
Attorney, Agent, or Firm—Oblon, Spivak, McClelland, Maier & Neustadt

[57] ABSTRACT

A process for producing a high resilience polyurethane foam by reacting a polyol with a polyisocyanate in the presence of a catalyst, a blowing agent, and a foam stabilizer; said polyisocyanate containing at least diphenylmethane diisocyanate and/or a mixture of diphenylmethane diisocyanate with a derivative thereof, the blowing agent being water, or water and a halogenated hydrocarbon in amounts of not less than 2 parts by weight of water and not more than 20 parts by weight of the halogenated hydrocarbon based on 100 parts by weight of the polyol, and the catalyst being at least one selected from the compounds represented by the formula (I) below:

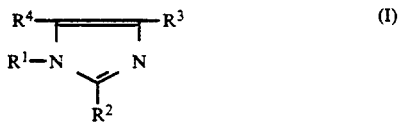

where $R^1$ is alkyl having 1 to 4 carbons, dimethylaminopropyl, benzyl, vinyl, or hydroxyalkyl having 1 to 3 carbons; $R^2$ is hydrogen, alkyl having 1 to 4 carbons, alkyl, benzyl or phenyl; and $R^3$ and $R^4$ are independently hydrogen; alkyl having 1 to 4 carbons, or hydroxymethyl.

12 Claims, No Drawings

PROCESS FOR PRODUCING HIGH RESILIENCE POLYURETHANE FOAM

BACKGROUND OF THE INVENTION

1. Field of the Invention

The present invention relates to a process for producing a high resilience polyurethane foam by reacting a polyol with a polyisocyanate in the presence of a catalyst, a blowing agent, and a foam stabilizer.

2. Description of the Background

High resilience polyurethane foams are widely used for a variety of articles such as automotive seating, furniture, bedding, and the like.

Heretofore, in production of high resilience polyurethane foams, toluene diisocyanate (hereinafter referred to as TDI), or a mixture of TDI with diphenylmethane diisocyanate (hereinafter referred to as MDI) has been used as the starting isocyanate. However, the TDI has disadvantages of high vapor pressure, high toxicity, and intolerably offensive odor, which aggravate working environments. The TDI has further a disadvantage of low reactivity with a starting polyol, which decreases the productivity and increases the plant investment.

To solve the above disadvantages caused by TDI, use of MDI and/or modified MD for high resilience polyurethane foams is disclosed in Japanese Laid-Open Patent Application Nos. 53-51299, 57-109820, and 62-112616, for example.

A polyurethane foam produced from MDI and/or modified MDI as the base materials is generally called "all-MDI high resilience polyurethane foam", which has excellent characteristics of superior foam properties, low toxicity to facilitate maintenance of a safe working environment at a production site, and also high production speed to increase productivity, for example.

On the other hand, the all-MDI high resilience polyurethane formulations involve serious problems. For example, the flow properties of the system-liquid and the flowability of foams are extremely poor so that low density of the foam cannot easily be attained. Accordingly, the lowering of foam density without impairing liquid flow characteristics or foam flowability is attained by using, as a blowing agent, a halogenated hydrocarbon such as trichloromonofluoromethane (hereinafter referred to as CFC-11) in an amount of from 5 to 15 parts by weight based on the polyol. However, this is still unsatisfactory, and further improvement is necessary in the starting material formulation and the production technique to attain a mopre reduced density of the all-MDI high resilience polyurethanes.

Regarding the halogenated hydrocarbons, the use of chlorofluorocarbons like CFC-11, which may destroy the ozone layer surrounding the earth, has attracted world-wide concern. This concern has prompted a reduction in the amount of use, however further reduction and increased regulation appear necessary.

In producing the all-MDI high resilience polyurethane foam, an urgent and newest problem is the need to reduce the amount of a chlorofluorocarbon (hereinafter referred to as CFC) as a blowing agent and to use more water instead.

On the other hand, "CFC-substituting compounds" such as methylene chloride, dichlorotrifluoroethane, and dichloromonofluoroethane (hereinafter referred to as HCFC-123, and HCFC-141b, respectively) have been proposed as substitutes for the CFC compounds such a CFC-11 which may destroy the ozone layer. However, these CFC-substituting compounds still have the implicit possibility of destroying the ozone layer, and, moreover, are expensive in comparison with the conventionally used CFC compounds. Therefore, the CFC-substituting compounds also cannot be used at the same high level. Further, this would also be undesirable from an economical point of view. Therefore, an improved formulation is strongly desired in which the amount of the CFC compound is decreased and, instead, the amount of water as a blowing agent is increased.

The use of water as a blowing agent in a larger amount, unfortunately, poses several technical problems such that foams become far less stable, thereby causing the phenomena of settling (in other words recession) and the like in the foaming process with the processing range being narrowed and with the properties of the foam being deteriorated. Thus, a low density of the foam is attained with extreme difficulty; and the moldability of the foam is inevitably impaired causing blistering of the foam surface and with the added liability of void build-up.

The conventionally used catalysts for all-MDI high resilience polyurethane foams are amine catalysts such as triethylenediamine as a base catalyst with bis(2-dimethylaminoethyl)ether or dimethylethanolamine as a cocatalyst. This amine catalyst system is not capable of lowering the density of a foam which employs conventionally used CFC compounds as the blowing agent, and will not give a practically useful high resilience polyurethane foam of low density when a blowing agent system of a decreased amount of CFC compound and an increased amount of water is used.

Thus, a need continues to exist for a process for producing a high resilience polyurethane foam, which foam is of a reduced density, and which process uses a reduced amount of chlorofluorocarbons (CFC).

SUMMARY OF THE INVENTION

Accordingly, it is an object of the present invention to provide a process for producing a high resilience polyurethane foam having a reduced density.

It is further an object of this invention to provide a high resilience polyurethane foam by a process which uses a reduced amount of CFC.

The above objects and others which will become more apparent in view of the following disclosure are provided by a process for producing a high resilience polyurethane foam by reacting a polyol with a polyiosyanate in the presence of a catalyst, a blowing agent and a foam stabilizer; said polyisocyanate containing at least diphenylmethane diisocyanate or a mixture of diphenylmethane diisocyanate with a derivative thereof, the blowing agent being water, or water and a halogenated hydrocarbon in an amount of not less than 2 parts by weight of water and not more than 20 parts by weight of the halogenated hydrocarbon based on 100 parts by weight of the polyol, the catalyst being at least one selected from the compounds represented by the formula (I):

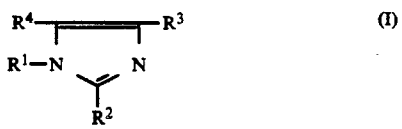

wherein $R^1$ is alkyl having 1 to 4 carbons, dimethylaminopropyl, benzyl, vinyl or hydroxyalkyl having 1 to 3 carbons; $R^2$ is hydrogen, alkyl having 1 to 4 carbons, allyl, benzyl or phenyl; and $R^3$ and $R^4$ are independently hydrogen, alkyl having 1 to 4 carbons or hydroxymethyl.

DETAILED DESCRIPTION OF THE PREFERRED EMBODIMENTS

In one aspect, the present invention provides a process for producing a high resilience polyurethane foam which enables the stabilization of the foam and the attainment of a lower density thereof than has been achieved before.

In another aspect, the present invention provides a process for producing an industrially useful high resilience polyurethane foam which allows for the use of a decreased amount of a CFC compound as a blowing agent.

In more detail, the present invention provides a process for producing a high resilience polyurethane foam by reacting a polyol with a polyisocyanate in the presence of a catalyst, a blowing agent, and a foam stabilizer; the polyisocyanate containing at least diphenylmethane diisocyanate or a mixture of diphenylmethane diisocyanate with a derivative thereof, or both, the blowing agent being water, or water and a halogenated hydrocarbon in amounts of not less than 2 parts by weight of water and not more than 20 parts by weight of the halogenated hydrocarbon based on 100 parts by weight of the polyol, and the catalyst being at least one selected from the compounds represented by the general formula (I) below:

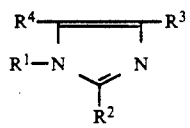

where $R^1$ is alkyl having 1 to 4 carbons, dimethylaminopropyl, benzyl, vinyl, or hydroxyalkyl having 1 to 3 carbons; $R^2$ is hydrogen, alkyl having 1 to 4 carbons, allyl, benzyl or phenyl; and $R^3$ and $R^4$ are independently hydrogen, alkyl having 1 to 4 carbons, or hydroxymethyl.

According to another aspect of the present invention, there is provided a process for producing a high resilience polyurethane foam by reacting a polyol with a polyisocyanate in the presence of a catalyst, a blowing agent, and a foam stabilizer; the polyisocyanate containing at least diphenylmethane diisocyanate or a mixture diphenylmethane diisocyanate with a derivative thereof, or both, the blowing agent being water, or water and a halogenated hydrocarbon in the amount of not less than 2 parts by weight of water and not more than 20 parts by weight of the halogenated hydrocarbon based on 100 parts by weight of the polyol, and the catalyst being at least one selected from the compounds represented by the formulas (II), (III), (IV), and (V) below:

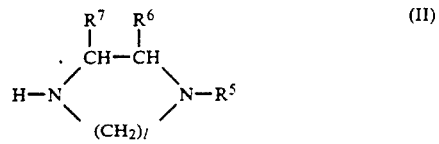

where $R^5$ is alkyl having 1 to 3 carbons, or dimethylaminoalkyl in which alkyl has 2 or 3 carbons; and $R^6$ and $R^7$ are respectively hydrogen or alkyl having 1 to 3 carbons; and l is an integer of 2 or 3,

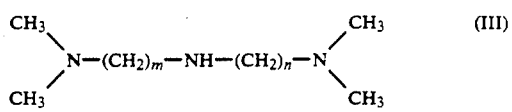

where m and n are respectively an integer of 2 or 3,

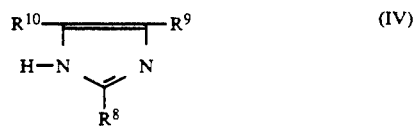

where $R^8$ is hydrogen, alkyl having 1 to 4 carbons, allyl, benzyl, or phenyl; and $R^9$ and $R^{10}$ are respectively hydrogen or alkyl having 1 to 4 carbons,

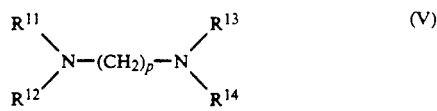

where $R^{11}$ is alkyl having 1 to 4 carbons; $R^{13}$ is —$CH_2CH(X)OH$ (X being hydrogen or alkyl having 1 to 4 carbons); $R^{12}$ and $R^{14}$ are respectively alkyl having 1 to 4 carbons or —$CH_2CH(X)OH$ (X being hydrogen or alkyl having 1 to 4 carbons), at least any one of $R^{12}$ and $R^{14}$ being alkyl; and p is an integer of 2 to 6.

The catalyst which are applicable in the present invention include the imidazole compounds represented by the formula (I) shown above, and the amine compounds having active hydrogen in the molecule thereof represented by the formulas (II), (III), (IV), and (V).

The imidazole compounds are exemplified by 1-methylimidazole, 1,2-dimethylimidazole, 1,4-dimethylimidazole, 1-methyl-2-ethylimidazole, 1,4-dimethyl-2-ethylimidazole, 1-methyl-2-isopropylimidazole, 1-methyl-2-phenylimidazole, 1-vinylimidazole, 1-benzyl-2-methylimidazole, 1-(3-dimethylaminopropyl)imidazole, 1-isobutyl-2-methylimidazole, 1-n-butyl-2-methylimidazole, and the like. More preferable are 1-methylimidazole, 1,2-dimethylimidazole, 1-(3-dimethylaminopropyl)imidazole, 1-isobutyl-2-methylimidazole, and 1-n-butyl-2-methylimidazole.

The amine compounds of the formula (II) include N-methylpiperazine, N-(2-dimethylaminoethyl)piperazine, N-methyl-3-methylpiperazine, N-methylhomopiperazine, and the like. The amine compounds of the formula (III) include N,N-dimethyl-N'(3-dimethylaminopropyl)ethylenediamine, bis(N,N-dimethylaminoethyl)amine, bis(N,N-dimethylaminopropyl)amine, and the like. The amine compounds of the formula (IV) include imidazole, 2-methylimidazole, 4-methylimidazole, 2-ethyl-4-methylimidazole, 2-isopropylimidazole, 2- ethylimidazole, 2-phenylimidazole, and the like. The compounds of the formula (V) include N,N-diisopropanol-N',N'- dimethylpropanediamine, N,N'-diisopropanol-N,N'- dimethylpropanediamine, N,N-diethanol-N',N'- dimethylethylenediamine, N,N'-diethanol-N,N'- dimethylethylenediamine, and the like. Among these compounds, particularly preferred are N-methylpiperazine, N-methylhomopiperazine, N,N-dimethyl-N'-(3-dimethylaminopropyl)ethylenediamine, bis(N,N-dimethylaminopropyl)amine, 2-methylimidazole, 4-methylimidazole, N,N-diisopropanol-N',N'-dimethylpropanediamine, N,N-diethanol-N',N'-dimethylethylenediamine, and N,N'-diethanol-N,N'-dimethylethylenediamine.

The amine catalyst of the present invention may be used combined with another compound having a tertiary amino group as a cocatalyst. Such compound having a tertiary amino group includes triethylamine, N,N-dimethylcyclohexylamine,
N,N,N',N'-tetramethylethylenediamine,
N,N,N',N'-tetramethylpropylenediamine,
N,N,N',N",N"-pentamethyldiethylenetriamine,
N-(3-dimethylaminopropyl)N,N',N'-trimethylethylenediamine,
N,N,N',N",N"-pentamethyldipropylenetriamine,
N,N,N',N'-tetramethylguanidine,
1,3,5-tris(N,N-dimethylaminopropyl)hexahydro-s-triazine,
1,8-diazabicyclo[5.4.0]undecene-7, triethylenediamine,
N,N,N',N',N"-pentamethyldiethylenetriamine,
N,N,N',N'-tetramethylhexamethylenediamine, N-methyl-N'-(2-dimethylamino)ethylpiperazine, N,N'-dimethylpiperazine,
N-methylmorpholine, N-ethylmorpholine,
N,N-dimethylethanolamine, dimethylaminoethoxyethanol,
N,N,N'-trimethylaminoethylethanolamine,
1,3-bis(N,N-dimethylamino)-2-propanol,
bis(2-dimethylaminoethyl)ether, and the like. Preferred are triethylenediamine and/or bis(2-dimethylaminoethyl)ether.

An organic carboxylate salt of the aforementioned compound of present invention, an organic carboxylate salt of other tertiary amines, or an organic tin compound may be optionally used as a cocatalyst provided that the activity of the catalyst of the present invention is not impaired.

The catalyst of the present invention may be prepared either from the compound of present invention singly or from a mixture thereof with another amine catalyst. In the preparation by mixing, a solvent such as dipropylene glycol, ethylene glycol, 1,4-butanediol, water and the like may be used, if necessary. The amount of the solvent is not particularly limited, but is preferably in an amount of not more than 70% of the total amount of the catalyst. The catalyst thus prepared may be used by adding to the polyol. Various amine catalysts may be added to the polyol separately.

The amine catalyst in the present invention is used usually in an amount ranging from 0.02 to 10 parts by weight based o 100 parts by weight of the polyol.

The polyol which may be used in the present invention includes known polyetherpolyols, polyesterpolyols and/or polymer polyols; preferably a polyetherpolyol, or a mixture of a polyetherpolyol with a polymer polyol. The polyetherpolyol may be produced, for example, by an addition reaction of ethylene oxide or propylene oxide to a polyhydric alcohol such as ethylene glycol, glycerin, trimethylolpropane, pentaerythritol, and the like according to a method, for example, described in "Polyurethane Handbook" (by Gunther Oertel): pages 42 to 53, and in Japanese Laid-Open Patent Application No. 62-112616. The polymer polyols are exemplified by those which are produced by reacting the aforementioned polyetherpolyol with an ethylenic unsaturated monomer such as butadiene, acrylonitrile, styrene and the like in the presence of a radical polymerization catalyst, as described in "Polyurethane Handbook" (by Gunther Oertel): pages 75 to 76.

The polyisocyanate component used in the present invention contains at least MDI and/or an derivative thereof. When the content thereof in the isocyanate component is 50% or more, the effect of the catalyst of the present invention is produced remarkably.

The MDI and its derivatives include, for example, a mixture of MDI with a polyphenyl-polymethylene diisocyanate, namely a polymeric MDI, and/or diphenylmethane diisocyanate derivatives having terminal isocyanate groups. The former mixture is exemplified by a mixture of MDI and its derivative, polyphenyl-polymethylene polyisocyanate, disclosed in Japanese Laid-Open Patent Application No. 53-51299. The latter diphenylmethane diisocyanate derivatives having terminal isocyanate groups are exemplified by known isocyanate-terminated prepolymers disclosed in Japanese Laid-Open Patent Application Nos. 57-109820 and 62-112616, which are prepared by reacting MDI, polyphenyl-polymethylene polyisocyanate and/or their mixture with a polyether-diol or -triol, optionally in the presence of a catalyst, at room temperature or at an elevated temperature.

The halogenated hydrocarbons applicable as a blowing agent in the present invention include known halogenated methanes, halogenated ethanes, and the like, among which carbon halides and halogenated hydrocarbons such as CFC-11, HCFC-123, HCFC-141b, and the like are preferable. The amount thereof to be used is not more than 20 parts by weight based on 100 parts by weight of the polyol, preferably from 0 to 15 parts by weight. The amount of water as a blowing agent is not less than 2 parts by weight, preferably in the range of from 2.5 to 5 parts by weight based on 100 parts by weight of the polyol. If water only is used therefor, the amount is preferably not less than 3 parts by weight. The amount of water and the CFC is suitably adjusted according to the intended foam density.

The isocyanate index in the present invention is generally within the range of from 70 to 120 although it is not limited thereto.

A crosslinking agent or a chain extender may be added if necessary in the present invention. The crosslinking agent or the chain extender includes, for example, low-molecular polyhydric alcohols such as ethylene glycol, 1,4-butanediol, glycerol, etc.; low-molecular aminepolyols such as diethanolamine, triethanolamine, etc.; polyamines such as ethylenediamine, xylylenediamine, methylene-bis-o-chloroaniline, etc.; secondary diamines like aliphatic and alicyclic secondary diamines, polyoxypropylene secondary diamines, aromatic secondary diamines, etc., and the like.

Additionally, various known additives may be used such as an organic silicone compound as a surfactant, a coloring agent, a flame retardant, an age resister, and the like, if necessary. The kind and the amount of the additives are satisfactorily selected within the ranges of known types and procedures conventionally employed.

The present invention has achieved high resilience polyurethane foams, of low density, which have never been achieved using a CFC as a blowing agent. Furthermore, the present invention has achieved, by employing a formulation with a reduced amount of CFC and an increased amount of water, the stabilization of foam cells and an excellent moldability of the foam in a foaming process. The foam produced also has a low density.

The present invention will now be further illustrated by reference to certain examples which are provided solely for illustration and are not intended to limitative.

EXAMPLES 1-26, COMPARATIVE EXAMPLES 1-13

The formulations for the all-MDI high resilience polyurethane foam systems used are shown below. In the formulations, the amount of water and halogenated hydrocarbons as the blowing agent, and the kind of the catalyst were changed. The foams were prepared under predetermined foaming conditions. The evaluation was conducted on the stability of the foams during the foaming process, the moldability of the foams, and the properties of the resulting foams according to the method described below. The results are shown in Tables 1, 2, 3, and 4.

a. Formulation

| | |
|---|---|
| Polyol[1] | 100 parts by weight |
| Foam stabilizer[2] | 1.0 part by weight |
| Water | varied |
| Halogenated hydrocarbon | varied |
| Catalyst[3] | varied |
| Isocyanate[4] | index varied |

[1] Polyetherpolyol: OH value: 28 mgKOH/g (a mixture of a tetraol and a triol, average molecular weight: 7000, ethylene oxide content: 15%)
[2] Silicone surfactant: SRX-274C, made by Toray Silicone K.K.
Abbreviation for catalysts in Table:
DMIZ: 1,2-dimethylimidazole
NMIZ: 1-methylimidazole
DMAPIZ: 1-(3-dimethylaminopropyl)imidazole
IBIZ 1-isobutyl-2-methylimidazole
TEDA-L33: 33% triethylenediamine solution in dipropylene glycol (made by Tosho Corporation)
TOYOCAT-MR: tetramethylhexamethylenediamine (made by Tosoh Corporation)
TOYOCAT-NP: 4-methyl-1-(2-dimethylaminoethyl) piperazine (made by Tosoh Corporation)
NMP: N-methylpiperazine
NMHP: N-methylhomopiperazine
DMNAEP: N-(2-dimethylaminoethyl)piperazine
BDMAPA: bis(N,N-dimethyl-3-aminopropyl)amine
2MIZ: 33% 2-methylimidazole solution in dipropylene glycol
DIPDPA: N,N-diisopropanol-N',N'-dimethylpropane diamine
DEDEA: N,N-diethanol-N'N'-dimethylethylenediamine
[4] Isocyanate: NCO concentration: 25.0%, a mixture of diphenylmethane diisocyanate and its derivative b. Foaming conditions

Temperature of starting material liquid: $20\pm1°$ C.
Stirring speed: 6000 rpm (5 seconds)
Mold: Foamed in aluminum box (dimension: $25\times25\times25$ cm).
Mold temperature: 40° C.

c. Evaluated items

The items below were evaluated.

Reactivity

Cream time: Time lapse before start of foaming (seconds)
Gel time: Time for resinification (fiber time) (seconds)
Rise time: Time lapse before the foam reaches its maximum foaming height (second)

Settling

The stability was evaluated by the degree of recession of the foam after the rise time.

Expansion ratio

The ratio (cm/g) was derived from the maximum foaming height divided by the foam weight. The larger the ratio, the higher is the foaming effect of water, and the lowe can the foam density be made.

Foam density

The density was measured of the test piece prepared by cutting the central portion of the foam into a size of $20\times20\times10$ cm.

Moldability

Blistering of foam and building-up of voids in the foam are observed, and evaluated in five grades.
1 : negligible
2 : slight
3 : medium
4 : considerable
5 : great As is clear from Table 1 and Table 2, by use of an imidazole compound as the catalyst, molded foams which have stabilized cells, low density, and excellent moldability could be produced on the basis of the formulation containing a decreased amount of CFC and an increased amount of water. On the contrary, as understood from the results of Comparative Examples 1-7, the use of conventional catalysts such as triethylenediamine gave foams which have a high density and poor moldability giving considerable blistering of foam, which shows that with such catalyst systems, the decrease of the CFC by use of increased amount of water is impracticable.

As is clear form Table 3 and Table 4, by use of a compound having an active hydrogen as the catalyst, molded foams which have stabilized cells, low density, and excellent moldability could be produced on the basis of the formulation containing a decreased amount of CFC and an increased amount of water. On the contrary, as understood from the results of Comparative Examples 8-13, the use of conventional catalysts gave foams which have a high density and poor moldability giving considerable blistering of foam, which shows that with such catalyst systems, the decrease of the CFC by use of increased amount of water is impracticable.

Having described the above invention, it will be apparent to one skilled in the art that many changes and modifications can be made to the above-described embodiments without departing from the spirit and scope of the present invention.

TABLE 1

| | Example | | | | Comparative Example | | | Example | |
|---|---|---|---|---|---|---|---|---|---|
| | 1 | 2 | 3 | 4 | 1 | 2 | 3 | 5 | 6 |

Blowing Agent (parts by weight)

TABLE 1-continued

|  | Example 1 | Example 2 | Example 3 | Example 4 | Comparative Example 1 | Comparative Example 2 | Comparative Example 3 | Example 5 | Example 6 |
|---|---|---|---|---|---|---|---|---|---|
| Water | 2.7 | 2.7 | 2.7 | 2.7 | 2.7 | 2.7 | 2.7 | 2.7 | 2.7 |
| CFC-11 | 10 | 10 | 10 | 10 | 10 | 10 | 10 | 0 | 0 |
| HCFC-123 | 0 | 0 | 0 | 0 | 0 | 0 | 0 | 12 | 0 |
| HCFC-141b | 0 | 0 | 0 | 0 | 0 | 0 | 0 | 0 | 9 |
| Isocyanate Index | 100 | 100 | 100 | 100 | 100 | 100 | 100 | 100 | 100 |
| Catalyst (parts by weight) | | | | | | | | | |
| DMIZ | 1.20 | — | — | — | — | — | — | — | — |
| NMIZ | — | 1.60 | — | — | — | — | — | 1.90 | 1.70 |
| DMAPIZ | — | — | 1.60 | — | — | — | — | — | — |
| IBIZ | — | — | — | 1.60 | — | — | — | — | — |
| TEDA-L33 | — | — | — | — | 1.00 | — | — | — | — |
| TOYOCAT-MR | — | — | — | — | — | 1.00 | — | — | — |
| TOYOCAT-NP | — | — | — | — | — | — | 1.20 | — | — |
| Reactivity (seconds) | | | | | | | | | |
| Cream Time | 12 | 15 | 13 | 14 | 14 | 11 | 12 | 13 | 14 |
| Gel Time | 88 | 97 | 90 | 95 | 90 | 84 | 89 | 91 | 93 |
| Rise Time | 144 | 166 | 150 | 160 | 151 | 98 | 110 | 135 | 140 |
| Foam Properties | | | | | | | | | |
| Foam Expansion Ratio × $10^2$ | 5.00 | 4.90 | 4.80 | 4.90 | 4.70 | 4.30 | 4.50 | 4.80 | 4.76 |
| Settling (%) | 0 | 0 | 0 | 0 | 0 | 3.5 | 3.9 | 0 | 0 |
| Foam Density (kg/m$^3$) | 33.7 | 34.2 | 35.5 | 34.3 | 36.2 | 42.7 | 40.0 | 34.8 | 34.3 |
| Moldability | 1 | 1 | 1 | 1 | 2 | 1 | 2 | 1 | 1 |

TABLE 2

|  | Example 7 | Example 8 | Comparative Example 4 | Comparative Example 5 | Comparative Example 6 | Example 9 | Example 10 | Comparative Example 7 |
|---|---|---|---|---|---|---|---|---|
| Blowing Agent (parts by weight) | | | | | | | | |
| Water | 4.0 | 4.0 | 4.0 | 4.0 | 4.0 | 4.5 | 4.5 | 4.5 |
| CFC-11 | 0 | 0 | 0 | 0 | 0 | 0 | 0 | 0 |
| HCFC-123 | 0 | 0 | 0 | 0 | 0 | 0 | 0 | 0 |
| HCFC-141b | 0 | 0 | 0 | 0 | 0 | 0 | 0 | 0 |
| Isocyanate Index | 80 | 80 | 80 | 80 | 80 | 80 | 80 | 80 |
| Catalyst (parts by weight) | | | | | | | | |
| DMIZ | 1.00 | — | — | — | — | 0.85 | — | — |
| NMIZ | — | 1.50 | — | — | — | — | 1.20 | — |
| TEDA-L33 | — | — | 0.80 | — | — | — | — | 0.80 |
| TOYOCAT-MR | — | — | — | 0.60 | — | — | — | — |
| TOYOCAT-NP | — | — | — | — | 0.80 | — | — | — |
| Reactivity (seconds) | | | | | | | | |
| Cream Time | 13 | 14 | 15 | 15 | 15 | 16 | 17 | 17 |
| Gel Time | 80 | 81 | 81 | 81 | 80 | 86 | 91 | 87 |
| Rise Time | 102 | 100 | 99 | 84 | 82 | 110 | 117 | 102 |
| Foam Properties | | | | | | | | |
| Foam Expansion Ratio × $10^2$ | 4.40 | 4.34 | 4.10 | 3.62 | 3.60 | 4.38 | 4.20 | 4.00 |
| Settling (%) | 0 | 0 | 0 | defoam | defoam | 0 | 0 | 0 |
| Foam Density (kg/m$^3$) | 39.0 | 39.8 | 43.6 | — | — | 41.0 | 40.0 | 44.5 |
| Moldability | 1 | 1 | 3 | 5 | 5 | 1 | 1 | 5 |

TABLE 3

|  | Example 11 | Example 12 | Example 13 | Example 14 | Example 15 | Example 16 | Example 17 | Comparative Example 8 | Comparative Example 9 | Comparative Example 10 | Example 18 | Example 19 |
|---|---|---|---|---|---|---|---|---|---|---|---|---|
| Blowing Agent (parts by weight) | | | | | | | | | | | | |
| Water | 2.7 | 2.7 | 2.7 | 2.7 | 2.7 | 2.7 | 2.7 | 2.7 | 2.7 | 2.7 | 2.7 | 2.7 |
| CFC-11 | 10 | 10 | 10 | 10 | 10 | 10 | 10 | 10 | 10 | 10 | 0 | 0 |
| HCFC-123 | 0 | 0 | 0 | 0 | 0 | 0 | 0 | 0 | 0 | 0 | 12 | 0 |
| HCFC-141b | 0 | 0 | 0 | 0 | 0 | 0 | 0 | 0 | 0 | 0 | 0 | 9 |
| Isocyanate Index | 100 | 100 | 100 | 100 | 100 | 100 | 100 | 100 | 100 | 100 | 100 | 100 |
| Catalyst (parts by weight) | | | | | | | | | | | | |
| NMP | 2.80 | — | — | — | — | — | — | — | — | — | 2.90 | 2.80 |
| NMHP | — | 1.80 | — | — | — | — | — | — | — | — | — | — |
| DMNAEP | — | — | 1.50 | — | — | — | — | — | — | — | — | — |
| BDMAPA | — | — | — | 1.40 | — | — | — | — | — | — | — | — |
| 2MIZ | — | — | — | — | 12.0 | — | — | — | — | — | — | — |
| DIPDPA | — | — | — | — | — | 1.80 | — | — | — | — | — | — |
| DEDEA | — | — | — | — | — | — | 1.90 | — | — | — | — | — |
| TEDA-L33 | — | — | — | — | — | — | — | 1.00 | — | — | — | — |
| TOYOCAT-NP | — | — | — | — | — | — | — | — | 1.20 | — | — | — |
| PMDPTA | — | — | — | — | — | — | — | — | — | 0.70 | — | — |
| Reactivity (seconds) | | | | | | | | | | | | |
| Cream Time | 11 | 10 | 12 | 13 | 14 | 13 | 13 | 14 | 12 | 12 | 12 | 11 |

TABLE 3-continued

|  | Example |  |  |  |  |  |  | Comparative Example |  |  | Example |  |
|---|---|---|---|---|---|---|---|---|---|---|---|---|
|  | 11 | 12 | 13 | 14 | 15 | 16 | 17 | 8 | 9 | 10 | 18 | 19 |
| Gel Time | 92 | 88 | 91 | 91 | 119 | 90 | 92 | 90 | 89 | 92 | 93 | 88 |
| Rise Time | 160 | 151 | 157 | 134 | 249 | 150 | 152 | 151 | 110 | 98 | 157 | 155 |
| Foam Properties |  |  |  |  |  |  |  |  |  |  |  |  |
| Foam Expansion Ratio × $10^2$ | 4.98 | 4.88 | 4.90 | 4.88 | 5.14 | 4.90 | 4.89 | 4.70 | 4.50 | 4.50 | 4.90 | 4.96 |
| Settling (%) | 0 | 0 | 0 | 0 | 0 | 0 | 0 | 0 | 3.9 | defoam | 0 | 0 |
| Foam Density (kg/m$^3$) | 35.3 | 35.5 | 35.5 | 34.7 | 31.4 | 35.4 | 35.5 | 36.2 | 40.0 | defoam | 35.8 | 35.1 |
| Moldability | 1 | 1 | 1 | 1 | 2 | 1 | 1 | 2 | 2 | 5 | 1 | 1 |

TABLE 4

|  | Example |  |  |  | Comparative Example |  | Example |  |  | Comparative Example |
|---|---|---|---|---|---|---|---|---|---|---|
|  | 20 | 21 | 22 | 23 | 11 | 12 | 24 | 25 | 26 | 13 |
| Blowing Agent (parts by weight) |  |  |  |  |  |  |  |  |  |  |
| Water | 4.0 | 4.0 | 4.0 | 4.0 | 4.0 | 4.0 | 4.5 | 4.5 | 4.5 | 4.5 |
| CFC-11 | 0 | 0 | 0 | 0 | 0 | 0 | 0 | 0 | 0 | 0 |
| HCFC-123 | 0 | 0 | 0 | 0 | 0 | 0 | 0 | 0 | 0 | 0 |
| HCFC-141b | 0 | 0 | 0 | 0 | 0 | 0 | 0 | 0 | 0 | 0 |
| Isocyanate Index | 80 | 80 | 80 | 80 | 80 | 80 | 80 | 80 | 80 | 80 |
| Catalyst (parts by weight) |  |  |  |  |  |  |  |  |  |  |
| NMP | 2.00 | — | — | — | — | — | 2.00 | — | — | — |
| BDMAPA | — | 1.00 | — | — | — | — | — | 1.00 | — | — |
| 2MIZ | — | — | 12.0 | — | — | — | — | — | 11.5 | — |
| DIPDPA | — | — | — | 1.30 | — | — | — | — | — | — |
| TEDA-L33 | — | — | — | — | 0.80 | — | — | — | — | 0.80 |
| TOYOCAT-NP | — | — | — | — | — | 0.80 | — | — | — | — |
| Reactivity (seconds) |  |  |  |  |  |  |  |  |  |  |
| Cream Time | 14 | 15 | 17 | 15 | 15 | 15 | 15 | 17 | 17 | 17 |
| Gel Time | 90 | 90 | 95 | 90 | 81 | 80 | 88 | 91 | 87 | 87 |
| Rise Time | 120 | 118 | 130 | 120 | 99 | 82 | 108 | 117 | 102 | 102 |
| Foam Properties |  |  |  |  |  |  |  |  |  |  |
| Foam Expansion Ratio × $10^2$ | 4.40 | 4.32 | 4.60 | 4.39 | 4.10 | 3.60 | 4.38 | 4.10 | 4.50 | 4.00 |
| Settling (%) | 0 | 0 | 0 | 0 | 0 | defoam | 0 | 0 | 0 | 0 |
| Foam Density (kg/m$^3$) | 39.0 | 39.6 | 35.0 | 39.3 | 43.6 | — | 39.3 | 43.0 | 35.5 | 44.5 |
| Moldability | 1 | 1 | 2 | 1 | 3 | 5 | 1 | 1 | 3 | 5 |

What is claimed as new and desired to be secured by letters patent of the United States is:

1. A process for producing a high resilience polyurethane foam by reacting a polyol with a polyisocyanate in the presence of a catalyst, a blowing agent, and a foam stabilizer; said polyisocyanate containing at least diphenylmethane diisocyanate or a mixture of diphenylmethane diisocyanate with a derivative thereof, or both, the blowing agent being water, and the catalyst being at least one selected rom the compounds represented by the formula (I) below:

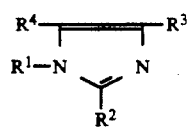

where $R^1$ is alkyl having 1 to 4 carbons, dimethylaminopropyl, benzyl, vinyl, or hydroxyalkyl having 1 to 3 carbons; $R^2$ is hydrogen, alkyl having 1 to 4 carbons, allyl, benzyl or phenyl; and $R^3$ and $R^4$ are independently hydrogen, alkyl having 1 to 4 carbons, or hydroxymethyl.

2. A process for producing high resilience polyurethane foam by reacting a polyol with a polyisocyanate in the presence of a catalyst, a blowing agent, and a foam stabilizer; said polyisocyanate containing at least diphenylmethane diisocyanate or a mixture of diphenylmethane diisocyanate with a derivative thereof, or both, the blowing agent being water, and the catalyst being at least one selected from the compounds represented by the formula (II), (III), (IV) and (V) below:

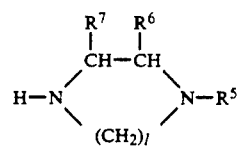

where $R^5$ is alkyl having 1 to 3 carbons, or dimethylaminoalkyl in which alkyl has 2 or 3 carbons; and $R^6$ and $R^7$ are respectively hydrogen or alkyl having 1 to 3 carbons; and is an integer of 2 or 3,

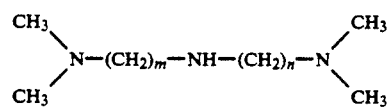

where m and n are respectively an integer of 2 or 3,

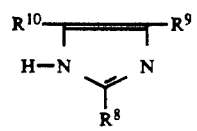

where $R^8$ is hydrogen, alkyl having 1 to 4 carbons, allyl, benzyl, or phenyl; and $R^9$ and $R^{10}$ are respectively hydrogen or alkyl having 1 to 4 carbons,

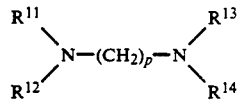

where $R^{11}$ is alkyl having 1 to 4 carbons; $R^{13}$ is —$CH_2CH(X)OH$, X being hydrogen or alkyl having 1 to 4 carbons; $R^{12}$ and $R^{14}$ are respectively alkyl having 1 to 4 carbons or —$CH_2CH(X)OH$, X being hydrogen or alkyl having 1 to 4 carbons, at least any one of $R^{12}$ and $R^{14}$ being alkyl; and p is an integer of 2 to 6.

3. The process of claim 1 or claim 2, wherein the polyisocyanate is diphenylmethane diisocyanate or a mixture of diphenylmethane diisocyanate and a derivative thereof, or both, and has an isocyanate index in the range of from 70 to 120.

4. The process of claim 1 or 2, wherein the polyol is a polyetherpolyol or mixture of a polyetherpolyol with a polymer polyol.

5. The process of claim 1 or 2, wherein the blowing agent is water in an amount of not less than 3.0 parts by weight based on 100 parts by weight of the polyol.

6. The process of claim 1, wherein the compound of the formula (I) is at least one selected from the group consisting of 1-methylimidazole, 1,2-dimethylimidazole, 1-(3-dimethylaminopropyl)imidazole, 1-isobutyl-2-methylimidazole, and 1-n-butyl-2-methylimidazole.

7. The process of claim 2, wherein the compound of the formula (II) is N-methylpiperazine, N-methyl-3-methylpiperazine, N-methylhomopiperazine, or N-(2-dimethylaminoethyl)piperazine.

8. The process of claim 2, wherein the compound of the formula (III) is N,N-dimethyl-(3-dimethylaminopropyl)ethylenediamine, or bis(N,N-dimethylaminopropyl)amine.

9. The process of claim 2, wherein the compound of the formula (IV) is imidazole, 2-methylimidazole, 4-methylimidazole, 2-ethyl-4-methylimidazole, 2-isopropylimidazole, 2-ethylimidazole or 2-phenylimidazole.

10. The process of claim 2, wherein the compound of the formula (V) is
N,N-diisopropanol-N',N'-dimethylpropanediamine,
N,N'-diisopropanol-N,N'-dimethylpropanediamine,
N,N-diethanol-N',N'-dimethylethylenediamine, or
N,N'-diethanol-N,N'-dimethylethylenediamine.

11. The process of claim 2, wherein said catalyst is further combined with another compound having a tertiary amino group as a cocatalyst.

12. The process of claim 2, wherein said catalyst is used in an amount of from 0.02 to 10 parts by weight based on 100 parts by weight of the polyol

* * * * *